United States Patent [19]

Mäder et al.

[11] Patent Number: 5,412,528

[45] Date of Patent: May 2, 1995

[54] SAFETY DISCONNECT SYSTEM

[75] Inventors: Carl C. Mäder, Hinwil; Giorgio Bovenzi, Jona; Robert Emmenegger, Lucerne, all of Switzerland

[73] Assignee: Ferag AG, Hinwil, Switzerland

[21] Appl. No.: 65,596

[22] Filed: May 21, 1993

[30] Foreign Application Priority Data

May 22, 1992 [CH] Switzerland ............... 01 660/92
Jul. 15, 1992 [CH] Switzerland ............... 02 257/92

[51] Int. Cl.⁶ .............................................. H02J 13/00
[52] U.S. Cl. ................................... 361/62; 361/64; 361/115
[58] Field of Search ............... 361/1, 62, 64, 66, 115, 361/23, 114; 307/34, 35, 38, 39

[56] References Cited

U.S. PATENT DOCUMENTS 4,090,088 5/1978 McMahon et al. ............... 307/38

FOREIGN PATENT DOCUMENTS

| | | | |
|---|---|---|---|
| 0465710A1 | 1/1992 | European Pat. Off. | F16P 3/00 |
| 3900733C2 | 8/1991 | Germany | F16P 3/00 |
| 3706325C2 | 1/1992 | Germany | G05B 9/02 |

OTHER PUBLICATIONS

Mannheim, Peter Raimund, "Method For Increasing the Availability and Reliability in Operation of Large Rolling Mills," BBC-Nachrichten [Brown, Boveri & Cie News], 1976, Issue 2/3.

Extract from: DER POLYGRAPH Issue 17-86, "Innovative Control Systems For Fully Automated Printing Machines".

Primary Examiner—Marc S. Hoff
Assistant Examiner—S. Jackson
Attorney, Agent, or Firm—Brinks Willian Hofer Gilson & Lione

[57] ABSTRACT

A safety disconnect system for an installation comprising machines which are designed to interact, has a machine disconnect level in which a dedicated disconnect circuit is allocated to each machine, an area disconnect level, in which disconnect areas which comprise groups of associated machines can be disconnected, and a system disconnect level which is allocated to all the machines of the installation. The disconnect circuits in each case have an electrically operable switching element which is connected via safety circuits to a main box for the central control of the safety disconnect system and, through this box, to a power supply. The safety circuits have operable tripping elements at the area disconnect level and at the system disconnect level, are constructed as latching circuits and are passed through the main box in which they can optionally be linked to one another by means of a switching matrix such that groups of associated machines are disconnected if one of the tripping elements is operated. In order to connect an additional machine to the safety disconnect system, it is necessary only to connect the disconnection circuit of this machine to the main box via an additional latching circuit. The wiring of the installation does not otherwise need to be modified, since the linking of the additional machine to the safety disconnect system takes place in the switching matrix of the main box.

17 Claims, 2 Drawing Sheets

SAFETY DISCONNECT SYSTEM

BACKGROUND OF THE INVENTION

The invention relates to a safety disconnect system of the type which has multiple disconnect levels.

Every technical device having a power supply which results in a risk of injury while fulfilling its operational object must be capable of being transferred into a safer state as quickly as possible, using an emergency switching device. The risk of injury can occur directly or indirectly as a risk for the personnel involved with the technical device, or for other parties. Emergency switching devices can accordingly be designed differently, specifically such that they must be operated deliberately by the personnel at risk themselves or by other parties. For example, emergency switching devices can be in the form of mushroom-headed buttons, panic switches, or emergency-off switches. Alternatively, emergency switching devices can be configured such that they are operated automatically in the event of danger by the resulting body movement of the person at risk. For example, such emergency switching devices can be in the form of emergency pull cords, light barriers and the like, or by monitoring elements of the machines themselves, such as overpressure valves and/or speed-monitoring devices.

Thus, each of the machines are allocated one dedicated disconnect circuit on which at least the emergency switching device can act such that the machine is immediately disconnected. In this context, the term "dedicated disconnect circuit" is intended to mean any type of machine-internal controller which can be acted on manually from the exterior, or by remote control, in order to disconnect the machine. Such a disconnection must at least cause the machine or its dangerous parts to be stopped. As soon as this has been effected, the power supply to its drive must be interrupted. In accordance with international safety guidelines, this has to be done by positively-guided mechanical contacts. The influence of the disconnect circuit allocated to each machine is limited to the associated machine itself at the machine disconnect level. Adjacent machines are stopped when necessary, but not disconnected.

The simultaneous disconnection of adjacent or other machines is carried out at the area disconnect level. At this level, groups of physically or technically associated machines can be isolated from the power supply immediately, or machines or groups of physically or technically associated machines can be electrically stopped (braked) and subsequently isolated from the power supply. The term "associated machines" in this case means machines in an installation which are designed to interact. For this purpose, in the prior art, the machine disconnect level and the area disconnect level which is hierarchically superior thereto are hardwired in a mistomer-specific manner. At the machine disconnect level, every machine has already been provided with its own dedicated disconnect circuit by its manufacturer.

Until now, there has been no standard for groups of such machines which allows them to be combined at the area disconnect level. New hardwiring is necessary on each occasion for this purpose. Such hardwiring must be produced on site and must be specially accepted, after being completed, by the safety officer, the authorities or the like.

In order to make it possible to easily disconnect not only machines or machine parts in the event of danger, but groups of the machines or machine parts which form a common danger area as a result of physical or technical association, the common danger area must initially be determined by means of a danger analysis. Subsequently, all the machines or the machine parts which form part of the area in an installation area combined to form a disconnect group, by means of hard wiring which must be specially made. Within the groups, there are in turn machines which must be disconnected immediately and machines which are connected to rotating masses and must be disconnected with a delay after braking. This further complicates the wiring.

A further disadvantage of prior art arrangements is that it is also necessary to modify the entire wiring in the event of any modification of the machine installation, for example resulting from the addition of extra machines. Furthermore, in the prior art arrangements this wiring is naturally very costly since dozens of emergency switching devices or emergency-off buttons, which are distributed in a machine installation, must be connected in series in accordance with the safety regulations in order that all the associated machines in a group are switched such that they are isolated from the voltage in the event of one emergency switching device or one emergency-off button being operated. The regulations demand positively-guided mechanical contacts for this isolation from voltage.

Additionally, in the prior art in the industrial area in a machine installation, separate control, monitoring and power lines are allocated to every machine, for reliable monitoring and control. This results in complicated cabling, which is difficult to maintain and is difficult to repair in the event of a defect. It is known (for example, from DE 37 06 325 C2) for the individual installation parts to be connected in parallel to a bus and for connection modules to be allocated to the individual installation parts for this purpose, with a host computer transmitting addressed telegrams via the bus to the individual connection modules. Examples of such installations are crane installations, production lines, rolling mills, production lines for further processing of printed products, and etc. In such an arrangement, the individual connection modules can be changed into the emergency-stopping state from the exterior by means of the host computer, by means of the individual connection modules themselves or, for example, by means of emergency switches as well, by causing switching contactors of motors, transportation devices etc. to trip. Every input circuit of the connection modules, including the bus connection, is for this purpose passed via voltage-resistant optocouplers. Furthermore, leakage paths and air gaps are maintained in the connection modules, in accordance with the respective regulations. In the case of this known control and data network, the combination of the connection modules into groups is, however, in any event carried out in software terms in the host computer. Thus, to this extent, it is not possible to conform with the requirement that the safety disconnection of a group be carried out completely via positively-guided mechanical contacts.

Control systems for fully automated printing machines are known from the German magazine "Der Polygraph" [The Polygraph], 17/1986, pages 16144–16150. In such control systems, a control installation is split into three levels, a production management level as the superior level, a management status level as the group management level of individual machine controllers, and the controller level, with the machine controller at the individual management level. Such a control installation would also not be directly suitable for safety disconnection, since the production units are coordinated via programmable controllers while the safety requirements demand positively-guided mechanical contacts. A safety disconnect system by means of individual hard wiring would therefore also have to be integrated into such a control installation. Such an arrangement would have the disadvantages described above.

Admittedly, the use of programmable control technology leads to the achievement of the maximum operating safety as a result of contact-free technology (cf. CH prospectus: WIFAG, Das zukunftsorientierte Steuerungssystem [The future-oriented control system], 3/86, pages 1–12, especially page 3). This, however, leads to further difficulties in the construction of a safety disconnect system which is fundamentally required, since, as mentioned, the safety regulations demand positively-guided mechanical contacts.

Admittedly, efforts have already been made to provide safety circuits in order to increase the operating safety in large rolling-mill installations (cf. BBC-Nachrichten [BBC News], Issue 2/3, Year 58, 1976, pages 92–97, especially page 95). However, only emergency-off switching loops using active-n technology, automatic stopping circuit breakers and position controllers of 2-channel design having non-equivalence monitoring, as well as 3-channel speed control having two out-of-three monitoring for a roll-stand drive having three motors are cited as exemplary uses of this. Further, it is proposed that, in the event of the power of a drive being split between a plurality of individually supplied motors, the control loops and regulation loops be linked to one another at an acceptable additional cost. Thus, in the event of one supply failing, the non-defective part of the drive can continue to operate temporarily at an increased load, or the installation can be stopped, at least in a manner such that it is still controlled. The problems which are caused by individually designed and hardwired safety disconnect systems and, in particular, in the event of modifications being carried out in the machine installation which is provided with the safety disconnect system are not dealt with in this case and can also not be solved using the measures specified.

Additionally, it is known (for example, from DE 39 00 733 C2) for a leakage and rotational-movement monitoring device to be designed such that overall monitoring which builds on the basic apparatus and is capable of expansion is possible with normal or enhanced safety without having to specify individual machine manufacturers. At the same time, the device is designed for individual leakage and rotational-movement monitoring devices to be connected mechanically in series so that every monitoring measurement system of every monitoring unit is able to trip the power supply unit and to stop the machine overall. However, for this purpose, in addition to a basic apparatus which comprises a power supply unit and a monitoring unit, a number of monitoring units corresponding to the complexity of the machine must, however, are added per machine or machine installation to be monitored. Thus, the otherwise necessary wiring cost is in this case replaced by a cost for monitoring units.

Therefore, it is an object of the present invention to improve a safety disconnect system of the type specified which has multiple disconnect levels such that areas which comprise machines or groups of associated machines can be combined while conforming to the safety requirements or, in their structure, can be modified or supplemented and disconnected, in a simple manner and with a very low wiring cost.

SUMMARY OF THE INVENTION

The safety disconnect system according to the invention is an intrinsically closed and separate system within which the allocation of machines to disconnect areas or the supplementing or modification of such disconnect areas can be carried out without it being necessary to modify the already existing wiring of a machine installation.

In the system of the present invention all the safety circuits of the machines are connected via a main box for the central control of the safety disconnect system. The main box includes a mechanical switching matrix by means of which safety circuits can be linked to one another as desired. Disconnect areas comprising machines or groups of associated machines can thus easily be linked in a customer-specific manner within the main box by changing over the mechanical switching matrix depending on the physical-engineering viewpoint, without it being necessary to intervene in the existing wiring of the machines. The required series connection of emergency switches or the like can be carried out easily in the switching matrix. This simplifies the entire wiring of the machine installation since only one control line need be laid to the main box for each machine, as the safety circuit, within which main box the individual control lines are then liked to one another by means of the switching matrix. The safety disconnect system according to the invention, that is to say the parts of a machine controller designed for safety, can thus advantageously be implemented in a simple manner separately from the functional part of the controller. Thus, there is no need to modify every machine operated in an installation, with respect to its safety device which exists and has generally already been accepted by the authorities. Thus, according to the invention, a safety disconnect system of modular construction is, so to speak, superimposed on the individual machine protection devices, and thus largely structurally separates the part of a machine controller responsible for safety from the functional part.

In one preferred embodiment of the invention, all the machines in the installation are allocated at least one operable tripping element at a system disconnect level which is superior to the area disconnect level. The tripping element is located in a connection between the power supply and the main box. As a result, when the tripping element operates, it causes the installation which is allocated to the power supply to be centrally isolated from the power supply. In the event of an acute risk to personnel or a serious installation defect, a disconnection can thus be initiated whereby the installation allocated to the power supply is systematically stopped and is centrally isolated from the power supply.

In another preferred embodiment of the invention the switching matrix has a priority matrix and an allocation matrix. The allocation matrix comprises row and column lines which can be connected at their intersections by mechanical switches. Of the row and column lines, the row lines are connected to the safety circuits and the column lines are connected to lines of the priority matrix, within the same priority matrix, the row and column lines can be connected by further mechanical switches to one another and to a common connection of the main box. The linkage of the safety circuits on the basis of mutual allocation and priorities can thus be achieved in the switching matrix in a simple manner by setting mechanical switches.

BRIEF DESCRIPTION OF THE DRAWINGS

An exemplary embodiment of the invention is described in more detail in the following text, with reference to the following drawings.

DETAILED DESCRIPTION OF THE PRESENTLY PREFERRED EMBODIMENTS

Figure 1:
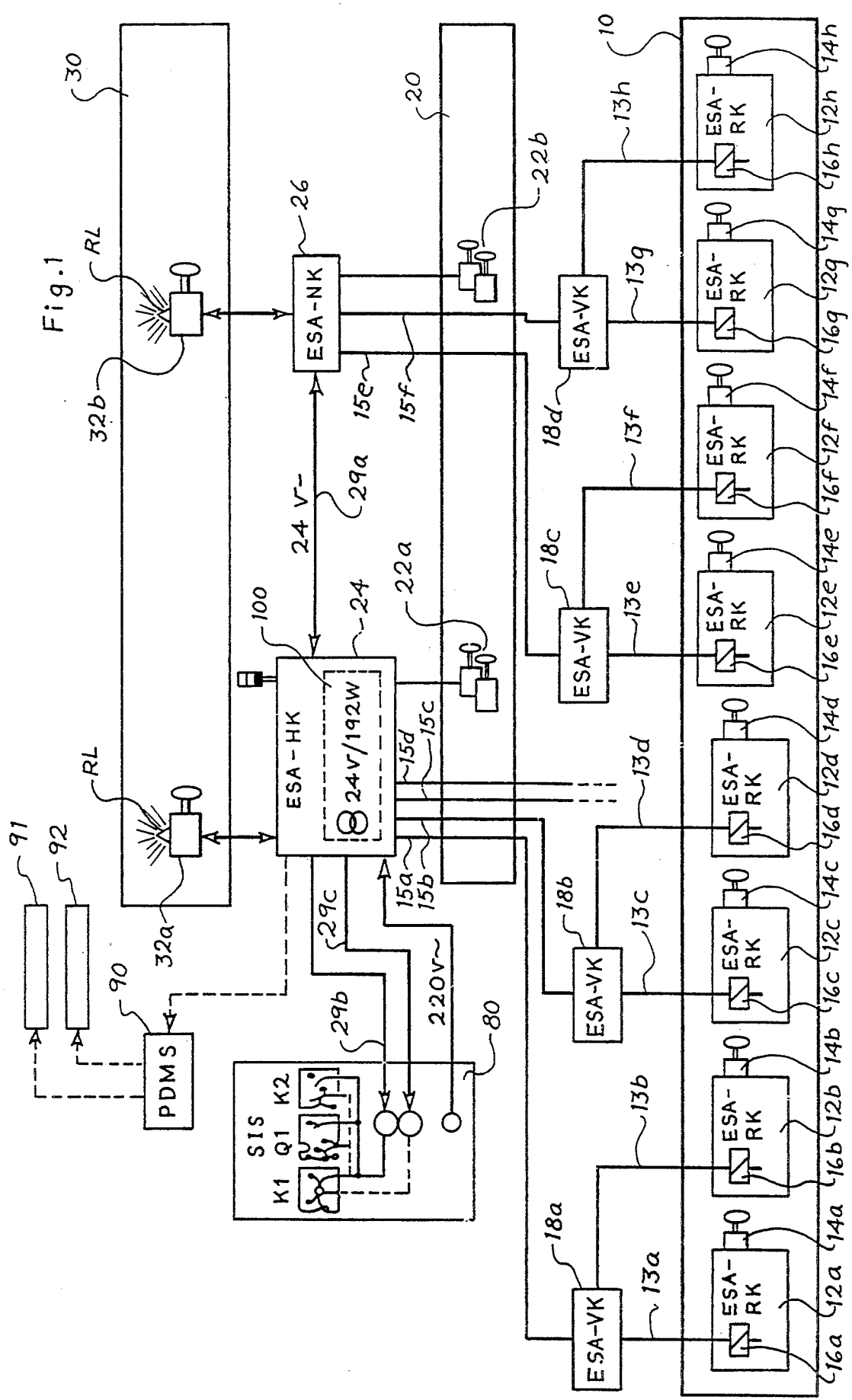
FIG. 1 shows an exemplary embodiment of the safety disconnect system according to the invention, in the form of a block diagram.

FIG. 1 shows a block diagram of a hierarchically constructed safety disconnect system having a machine disconnect level 10, an area disconnect level 20 and a system disconnect level 30. The safety disconnect system is provided for an installation comprising machines 12a–12h which are designed to interact. Such an installation may be, for example, a product line for the further processing of printed products, a rolling mill, a transfer line or the like. Since the type of installation is not important for the invention, there is no need to describe the type of installation itself in more detail.

Figure 2:
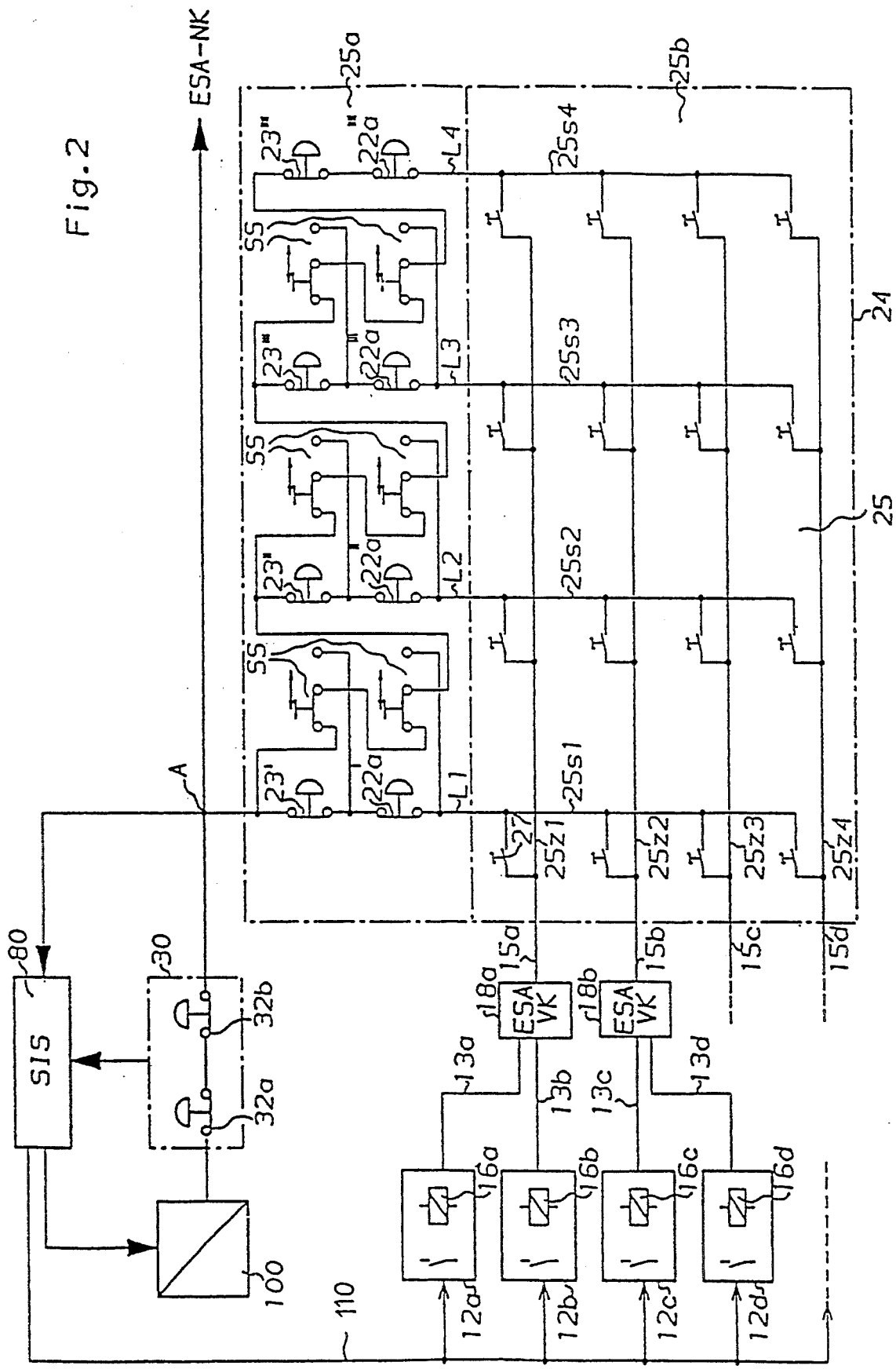
FIG. 2 shows an outline circuit diagram of the safety disconnect system according to FIG. 1.

At the machines disconnect level 10, every machine 12a–12h in the installation is allocated a dedicated disconnect circuit which, in the exemplary embodiment shown, can be operated manually by an emergency switching device 14a–14h. The disconnect circuit is a latching circuit in this case, which is opened by means of the emergency switching device 14a–4h. Furthermore, every disconnect circuit has at least one electrically operable switching element 16a–16h. In the exemplary embodiment shown, the electrically operable switching element 16a–16h is the coil of a relay device which is likewise located in the latching circuit and has an associated normally-closed contact, as is shown in FIG. 2. The latching circuit within the machine 12a–12h, in which latching circuit the emergency switching device 14a–14h and the electrically operable switching element 16a–16h are located, has in this case been assumed only as a simplified example. A dedicated latching circuit, which can act on the internal machine controller (not shown) in a suitable manner, could also be provided for each emergency switching device and to each electrically operated switching element. The effect of the manual emergency switching devices 14a–14h and of the electrically operable switching elements 16a–16h is limited to those machines to which they are in each case allocated. Adjacent machines are stopped, when necessary, but are not disconnected.

At the area disconnect level 20, operable tripping elements 22a, 22b are combined, in the event of whose operation groups of machines which are associated in production-engineering terms are immediately isolated form a power supply 100 which is allocated to the installation, or machines or groups of machines which are associated in production engineering terms are electrically stopped (braked) and are subsequently isolated from the power supply. Buttons which in each case have two positively-interrupting normally-closed contacts for 2-channel disconnection are provided as operable tripping elements 22a, 22b. Safety circuits 13a–13h and control lines 15a–15f, 29a–29c which are shown in the drawings and are explained in more detail in the following text are in each case two-wire lines which are shown in simplified form.

The aforementioned power supply 100 is to be understood as the main power supply of the safety disconnect system, not the network power supply of the machines 12a–12h which are to be disconnected by the safety disconnect system. The power supply 100 has been omitted in FIG. 1, for clarity, and has been show only in FIG. 2. As part of the network power supply of the machines 12a–12h, FIG. 2 shows only a common line 110 which can be isolated from the network (not shown) via an automatic circuit breaker cabinet (SIS) 80, which is explained in more detail below. When the installation is isolated from the power supply 100 in the circuit shown in FIG. 2, the line 110 in consequence ceases to be live.

At the safety disconnect level 30, operable tripping elements 32a, 32b are combined, by means of which all the machines 12a–12d or 12e–12h respectively of a production line or of an entire installation can be jointly disconnected. The operable tripping elements 32a, 32b are preferably likewise buttons in each case. If they are operated, the entire production line is systematically stopped and is centrally isolated from the power supply 100 in an automatic circuit breaker cabinet (SIS) 80, which is described in more detail below. Systematic stopping includes, when necessary, electrical braking of machines, protection of the data of a process computer (not shown) and disconnection of the power supply. In this case, disconnection is intended to mean stopping of mechanical and pneumatic movements as well as destruction of the hazardous energies of one or more machines.

In the exemplary embodiment described here, the electrically operable switching elements 16a–16h of the machines 12a–12h are in each case connected via one of the safety circuits 13a–13d and 13e–13h and, in pairs, via one of the control lines 15a–15d or 15e and 15f respectively to a main box (ESA-HK) 24 for the central control of the safety disconnect system, or to an auxiliary box (ESA-NK) 26, which is connected to the main box via the control line 29a. The main box is further connected via the control line 29b and 29c to two power contactors K1 and K2, which are contained in the automatic circuit breaker cabinet 80 and whose operation is explained in more detail below. The auxiliary box 26 is merely an extension unit to the main box 24 in order to duplicate the connection capabilities of areas and of operable tripping elements. If the connection capacity of the main box 24 is suitable, the auxiliary box 26 can be omitted, and all the safety circuits 13a–13h can be connected to one and the same main box 24 via the control lines 15a–15f. The safety circuits 13a–13h are connected to the power supply 100 via the control lines 15a–15f and the main and auxiliary boxes 24, 26. In a manner which is described in more detail below, the main box 24 determines which areas or groups of machines 12a–12b or 12c–12d respectively are disconnected if one of the tripping elements 22a operates. Since the auxiliary box 26 represents merely an extension of the main box 24, the following description is limited to the devices which are connected directly to the main box 24.

Two distribution boxes (ESA-VK) 18a, 18b are arranged between the main box 24 and the machines 12a–12d as the nodes of two disconnect areas between the safety circuits 13a, 13d and their control lines 15a, 15b. The distribution boxes in each case distribute a latching voltage, which is emitted from the main box 24 via the control lines 15a, 15b, for the safety circuits in parallel via the safety circuits 13a, 13b and 13c, 13d respectively, which are used in the machines which are connected. (A corresponding situation applies to distribution boxes 18c, 18d which distribute a latching voltage which is emitted from the auxiliary box 26 in parallel to the machines 12e–2h). The distribution boxes are thus a type of control line concentrator.

The electrically operable switching elements 16a–16d in the disconnect circuits of the machines 12a–12d in each case comprise the relay device which has already been mentioned above, is driven with the latching voltage from the main box 24 in normal operation and disconnects the machine in the event of this voltage being interrupted. Every relay device is constructed as a redundant relay combination (ESA-RK). In normal operation, the redundant relay combination is driven with a latching DC voltage of 24V from the main box 24 or the auxiliary box 26. If this voltage is interrupted (in the event of a system disconnection or area disconnection), the redundant relay combination interrupts the disconnect circuit in the machine directly or emits a suitable disconnect command to the machine-internal controller. Each relay combination comprises a link of three relays having positively-guided contacts and thus fulfills the requirement for a self-monitoring controller. Circuits which are self-monitoring are designated to be those in which, and by means of which, any initial defect on the participating switching apparatuses is identified, and switching-on again or reactivation of the safety device is automatically prevented. In this case, the actual safety function is not adversely affected, that is to say the disconnect function is at least correctly and reliably ensured once again, even in the event of a defect in the electrical device. Thereafter, switching-on again is prevented until the defect which has occurred has been rectified. As has already been mentioned above, the disconnection takes place on two channels and with different potentials, that is to say emergency off buttons etc. are designed having in each case two normally-closed contacts, since the simultaneous presence of two defects is precluded.

The manual emergency switching devices 14a–14h, which are allocated individually to each machine, and the tripping elements 22a, 22b at the area disconnect level 20, as well as the tripping elements 32a, 32b at the system disconnect level 30 are in each case differently marked and indicated in order that the operator knows from the start in the case of elements such as buttons and the like which are to be tripped manually the level at which said element initiates a disconnect process. The tripping elements 22a, 22b at the area disconnect level 20 are constructed as buttons having a red identification lamp (not shown) which illuminates immediately as soon as the button is operated. The initiation of every button at the area disconnect level 20 is thus identified at a distance. In addition, a green disconnect monitoring lamp (not shown) can be provided on the button at the area disconnect level 20. The lamp illuminates as soon as all the machines in the corresponding area have been safely stopped. The green disconnect monitoring lamp illuminates only when the button at the area disconnect level 20 has been operated, that is to say not in the event of a system disconnection. Each of the operable tripping elements 32a, 32b at the system disconnect level 30, which are likewise buttons in this case, is also equipped in a corresponding manner with a red identification lamp RL. The control devices for these monitoring lamps are not part of the invention and are thus also not described further.

The buttons which are used in the safety disconnect system according to the invention at the area disconnect level 20 and at the system disconnect level 30 fundamentally emit state information. The buttons are latching-in buttons. As soon as a button is pressed down, that is to say even before the button has latched in, each button initiates a reset function from the machine causing the resetting for the disconnect process to be initiated in the machine. Each button remains in the latched-in position until it is reset manually.

The construction of the main box 24 will now be described in more detail using the outline circuit diagram shown in FIG. 2. The main box 24 contains a mechanical switching matrix 25 by means of which the safety circuits 13a–13d, 15a–15d are optionally linked to one another such that areas which comprise machines or groups of associated machines are disconnected on operation of one of the tripping elements 22a at the area disconnect level 20. In FIG. 1, the four control lines 15a–15d are connected to the output of the main box 24, the control line 15a supplying a control voltage to a disconnect area which is formed from the machines 12a, 12b, the control line 15b supplying a disconnect area which is formed from the machines 12c and 12d, and the disconnect areas which are connected to the control lines 15c and 15d not having been shown, for the sake of clarity. The machines which are connected to the control lines 15c and 15d are also not shown in FIG. 2. However, it is clear that in each case one individual machine or one group of machines will be connected to the control lines 15c and 15d in each case. The control lines 15a–15f are part of the safety circuits 13a–13h connected to them.

The switching matrix 25 consists of a priority matrix 25a and an allocation matrix 25b. The allocation matrix 25b comprises row and column lines 25z1–25z4 and 25s1–25s4 respectively, which can be connected at their intersections by mechanical switches 27. Of these mechanical switches 27, there are sixteen in the exemplary embodiment shown in FIG. 2, only one having been designated with the reference number 27, for simplicity. Furthermore, in the exemplary embodiment shown in FIG. 2, the row lines 25z1 and 25z2 are connected to the safety circuits 13a–13d, 15a, 15b (as has been mentioned, the safety circuits which are connected to the row lines 25z3 and 25z4 via the control lines 125c and 15d are not shown, for the sake of simplicity). The column lines 25s1–25s4 are connected to lines L1–L4 of the priority matrix 25a and, within the same, can be connected by further mechanical switches SS (which are shown as three-pole changeover switches here) to one another and to a common connection A of the main box 24. Six changeover switches SS are provided which are connected in the manner shown in FIG. 1. The tripping elements 22a'–22a'''' at the area disconnect level 20 are in each case located in the lines L1–L4, which form the continuations of the column lines 25s1–25s4, in the priority matrix 25a. The changeover switches SS are arranged and constructed such that the end of each subsequent line in the priority matrix 25a can optionally be connected to the preceding line upstream or downstream of the changeover switch SS in the preceding line. Furthermore, the tripping elements $22a'$–$22a''''$ at the area disconnect level 20 are in each case connected in series with a safety element $23'$–$23''''$ in the lines L1–L4 in the priority matrix 25a. One pair of changeover switches SS is provided per column line $25s1$–$25s4$. One of the changeover switches SS in each changeover switch pair is arranged and constructed according to representation in FIG. 2 such that the end of each subsequent line in the priority matrix 25a can optionally be connected to the preceding line upstream or downstream of the series circuit comprising the tripping element and the safety element, or to the connection, which is provided within the series circuit, between the tripping element and the safety element in the preceding line.

On the basis of the positions of the changeover switches SS shown in FIG. 2, the line L2 is connected to the line L1 upstream of the series circuit comprising the tripping element $22a'$ and the safety element $23'$. Thus, when the tripping element $22a'$ or the safety element $23'$ is operated, although the voltage applied to the column line $25s1$ is interrupted, the voltage is still, however, applied to the lines L2–L4 and hence to the column lines $25s2$–$25s4$. If the changeover switch SS which is shown in the priority matrix 25a at the top of the left in FIG. 2, were moved into its right-hand switch position, then, if the safety element $23'$ were operated, not only would the line L1 and the column line $25s1$ no longer be live, but neither would all the subsequent lines L2–L4 and $25s2$–$25s4$. Thus, suitable selection of the positions of the changeover switches SS in the manner indicated allows priorities apply to the connections of the lines L1–L4 to one another and to the common connection A of the main box 24. The mutual allocation of the column lines $25s1$–$25s4$ and of the row lines $25z1$–$25z2$ takes place, as mentioned, by means of the switches 27. When the switch 27, which is shown at the top on the left in the allocation matrix 25b, is closed, the column line $25s1$, which is connected to the line L1 in the priority matrix 25a, is connected to the row line $25z1$ at its intersection with said row line $25z1$, etc. In this way, column and row lines can be allocated to one another and machines can thus optionally be combined in disconnect areas in a simple manner. As is shown in FIG. 2, the connection A of the main box 24 is connected to the automatic circuit breaker cabinet 80. In the outline circuit diagram in FIG. 2, the connection A at the same time forms the connection for the main box 24 and the connection for the power supply 100 and the system disconnect level 30. In FIG. 2, the line 110 connects the automatic circuit breaker cabinet 80 to the machines $12a$–$12d$, and is thus part of the power circuit of the machines, from which every machine can be isolated by interruption contacts which are operated by the switching elements $16a$–$16d$, which are part of the control loop of the machine. The control loop, for its part, is part of the safety disconnect system.

Thus, by suitably setting the switches 27 and the changeovers switches SS, the construction and method of operation of the switching matrix 25 make it possible to define from the start, and centrally in the main box, which machines or machine groups are intended to be disconnected when one of the tripping elements $22a'$–$22a''''$ and/or one of the safety elements $23'$–$23''''$ is operated. The disconnect process itself controls the main box 24, in conjunction with the automatic circuit breaker cabinet 80, as follows.

If one of the system buttons 32a, 32b is operated, all the machines are isolated from the power supply 100 by means of a two-stage disconnection in the automatic circuit breaker cabinet 80. To be precise, in this case, machines can be isolated from the power supply immediately, according to FIG. 1, by means of a power contactor K1. In contrast other machines can be isolated from the power supply in a delayed manner, by means of a power contactor K2 (for example having a delay time of 0.5–10 seconds). In this case, the process host computer and the like are, however, not switched so that they are no longer live. The central control unit for the safety disconnection of the installation is the main box 24. If any of the tripping elements $22a'$–$22a''''$ and/or any of the safety elements $23'$–$23''''$ at the area disconnect level 20 or any of the tripping elements 32a, 32b at the system disconnect level 30 is operated (that is to say is opened since they in each case have normally-closed break contacts), the control line $15a$–$15d$, which is allocated by means of suitable positioning of the switches SS, is rendered no longer live. Thus, the associated relay device of the relay devices $16a$–$16h$ drops out in order to disconnect the corresponding machine of the machines $12a$–$2h$. As is shown in FIG. 1, an AC voltage of 220 V from the power supply 100 can be applied (or externally supplied) directly to the main box 24 via the automatic circuit breaker cabinet 80.

Furthermore, according to FIG. 1, the main box 24 is connected to a superior display and evaluation system (PDMS) 90 for all the states of the safety disconnect system. The display and evaluation system 90 contains an evaluation unit (not shown in detail) which is connected to display units 91, 92 which can be added on separately and locally. All the lines in the safety disconnect system are continuously monitored for continuity in order to increase the passive safety. Defects which occur or safety switches which trip can be displayed by means of the display units 91, 92. The devices which are provided for continuity monitoring of the lines have likewise not been shown.

Finally, the safety disconnect system contains monitoring devices which determine whether a desired disconnect process has actually been carried out. This is displayed on the one hand on the main box and likewise via the display units 91, 92. These monitoring devices have also not been shown in detail. The additionally provided display capability by means of identification lamps on the buttons has already been mentioned above.

We claim:

1. A safety disconnect system for an installation having a plurality of machines which are designed to interact, the safety disconnect system comprising:
   a machine disconnect level including a dedicated disconnect circuit allocated to each machine;
   an area disconnect level, which is superior to the machine disconnect level, in which areas which comprise machines or groups of associated machines can be disconnected;
   each disconnect circuit having at least one electrically operable switching element, the electrically operable switching elements being connected via safety circuits to a main box for central control of the safety disconnect system and through the main box to a power supply;
   operable tripping elements at the area disconnect level being allocated to the safety circuits;

the main box having a mechanical switching matrix by means of which the safety circuits can be optionally linked to one another such that predetermined areas or groups of machines can be disconnected by operating one of the tripping elements at the area disconnect level.

2. The safety disconnect system as claimed in claim 1, wherein all the machines in the installation are allocated at least one operable tripping element at a system disconnect level which is superior to the area disconnect level, the tripping element being located in a connection between the power supply and the main box such that when the tripping element operates, it causes the entire installation to be centrally isolated form the power supply.

3. The safety disconnect system as claimed in claim 1, wherein the switching matrix includes a priority matrix and an allocation matrix, the allocation matrix comprising row and column lines which can be connected at their intersections by mechanical switches, and, wherein of the row and column lines, one group of lines are connected to the safety circuits and the other group of lines are connected to lines of the priority matrix and, within the priority matrix, the row and column lines can be connected by further mechanical switches to one another and to a common connection of the main box.

4. The safety disconnect system as claimed in claim 3, wherein the tripping elements at the area disconnect level are located in the lines in the priority matrix, and wherein the further mechanical switches are arranged and constructed such that the end of each subsequent line in the priority matrix can optionally be connected to the preceding line upstream or downstream of the tripping element in the preceding line.

5. The safety disconnect system as claimed in claim 3, wherein the tripping elements at the area disconnect level are in each case connected in series with at least one safety element in the lines in the priority matrix, and wherein the further mechanical switches are arranged and constructed such that the end of each subsequent line in the priority matrix can optionally be connected to the preceding line upstream or downstream of the series circuit or to the connection, which is provided within the series circuit, between the tripping element and the safety element in the preceding line.

6. The safety disconnect system as claimed in claim 2, having an automatic circuit breaker cabinet connected to the main box and in which the central isolation of the installation from the power supply is carried out in the event of a disconnection at the system disconnect level.

7. The safety disconnect system as claimed in claim 1, wherein the electrically operable switching elements in the disconnect circuits of the machines in each case comprise a relay device which is driven with a voltage from the main box in normal operation and disconnects the machine in the event of this voltage is interrupted.

8. The safety disconnect system as claimed in claim 7, wherein each of the relay devices comprises a redundant relay combination.

9. The safety disconnect system as claimed in claim 7 further comprising a distribution box arranged, as a node of a disconnect area, in the safety circuits between the main box and the machines, the distribution box distributing the voltage in parallel to the relay devices which are used in the machines which are connected.

10. The safety disconnect system as claimed in claim 1, further comprising an auxiliary box as an extension unit for the main box, whereby the connection capabilities of disconnect areas and operable tripping elements are extended.

11. The safety disconnect system as claimed in claim 1, wherein the operable tripping elements in each case have two positively-interrupting normally-closed contacts for 2-channel disconnection.

12. The safety disconnect system as claimed in claim 11, wherein the operable tripping elements comprise buttons.

13. The safety disconnect system as claimed in claim 11, wherein the operable tripping elements comprise switches.

14. The safety disconnect system as claimed in claim 1, further comprising an evaluation unit and wherein the main box is connected to the evaluation unit.

15. The safety disconnect system as claimed in claim 14, further comprising a display unit and wherein the evaluation unit is connected to the at least one display unit.

16. The safety disconnect system as claimed in claim 6, wherein the automatic circuit breaker cabinet is constructed such that operation of one of the tripping elements at the system level results in central isolation of the installation from the power supply by means of two-stage disconnection, separately for machines which have to be disconnected with a delay and without a delay.

17. The safety disconnect system as claimed in claim 16, wherein the automatic circuit breaker cabinet has a first power contactor for the immediate isolation from the power supply of the machines which have to be disconnected without a delay, and a second power contactor for the delayed isolation from the power supply of the machines which must be disconnected with a delay, the first and second power contactors being connected to the main box via control lines.

* * * * *

UNITED STATES PATENT AND TRADEMARK OFFICE
CERTIFICATE OF CORRECTION

PATENT NO. : 5,412,528
DATED : May 2, 1995
INVENTOR(S) : Carl C. Mäder

It is certified that error appears in the above-indentified patent and that said Letters Patent is hereby corrected as shown below:

<u>In the Claims</u>
Col. 11, line 14
In Claim 2, line 8, delete "form" and substitute --from--.

Signed and Sealed this

Third Day of October, 1995

Attest:

BRUCE LEHMAN

Attesting Officer  Commissioner of Patents and Trademarks